(12) United States Patent
Brillon

(10) Patent No.: US 7,135,963 B2
(45) Date of Patent: Nov. 14, 2006

(54) METHOD FOR LOCATING A BADGE FOR A MOTOR VEHICLE HANDS-FREE SYSTEM

(75) Inventor: Alain Brillon, Villeneuve Tolosane (FR)

(73) Assignee: Siemens VDO Automotive, Toulouse (FR)

( * ) Notice: Subject to any disclaimer, the term of this patent is extended or adjusted under 35 U.S.C. 154(b) by 160 days.

(21) Appl. No.: 10/482,204

(22) PCT Filed: May 17, 2002

(86) PCT No.: PCT/EP02/05466

§ 371 (c)(1),
(2), (4) Date: Dec. 29, 2003

(87) PCT Pub. No.: WO03/002384

PCT Pub. Date: Jan. 9, 2003

(65) Prior Publication Data

US 2004/0178962 A1 Sep. 16, 2004

(30) Foreign Application Priority Data

Jun. 27, 2001 (FR) .................................. 01 08470

(51) Int. Cl.
*B60R 25/10* (2006.01)
*H04Q 5/22* (2006.01)
(52) U.S. Cl. .................. 340/426.36; 340/5.6; 340/5.61; 340/7.23; 340/10.1; 340/10.4

(58) Field of Classification Search ............ 340/426.36
See application file for complete search history.

(56) References Cited

U.S. PATENT DOCUMENTS

| 4,873,530 A | 10/1989 | Takeuchi et al. |
| 6,552,649 B1 * | 4/2003 | Okada et al. .............. 340/5.61 |
| 6,707,375 B1 * | 3/2004 | Masudaya .................. 340/5.61 |
| 2001/0010489 A1 * | 8/2001 | Baudard .................... 340/5.72 |

FOREIGN PATENT DOCUMENTS

| DE | 198 35 155 | 2/2000 |
| EP | 0 523 602 | 1/1993 |

* cited by examiner

*Primary Examiner*—Donnie L. Crosland
(74) *Attorney, Agent, or Firm*—Young & Thompson

(57) ABSTRACT

A method for locating a badge for a motor vehicle handsfree system includes transmission in the form of an inquiry of a signal by a first group of antennas of the vehicle to the tag, response of the tag to this first inquiry, transmission in the form of an inquiry of a signal by a second group of antennas of the vehicle to the tag, and response of the tag to this second inquiry. In responding to the first inquiry, the tag stores for a predetermined time span the fact that it has responded to a signal transmitted by an antenna of the first group of antennas. The response made to the second inquiry may include a cue indicating that a response has already been transmitted following an inquiry originating from the first group of antennas.

14 Claims, 2 Drawing Sheets

METHOD FOR LOCATING A BADGE FOR A MOTOR VEHICLE HANDS-FREE SYSTEM

CROSS REFERENCE TO RELATED APPLICATIONS

This is the 35 USC 371 national stage of International application PCT/EP02/05466 filed 17 May 2002, which designate the United States of America.

FIELD OF THE INVENTION

The present invention relates to a process for locating a tag used in particular for a hands-free system of a motor vehicle.

A hands-free system makes it possible to access one's vehicle and to start the latter without having to use a mechanical key. The user of the vehicle is then simply furnished with an electronic card (also referred to hereinafter as a tag) which is detected and recognized by a control and management device associated with antennas disposed on board the vehicle. If the card is identified by the control and management device as being a card authorized for the vehicle, the carrier of this card can enter inside the vehicle by simply grasping a door handle and start the engine of the vehicle by simple action on a button.

It will be noted that the term "tag" in fact covers any key system whether or not it comprises a rigid electronic card (example: electronic components placed on a flexible circuit, or on a hybrid circuit, etc).

BACKGROUND OF THE INVENTION

Generally, for such a hands-free system, a group of antennas is intended to detect the presence of the tag outside the vehicle and another inside the latter. If an authorized tag is detected outside the vehicle, the control and management system will allow access on board the vehicle without however allowing starting, whereas if this tag is inside the vehicle, starting of the engine will be able to occur.

To locate the tag, a signal is sent to a group of antennas which then carry out a corresponding transmission while no signal is sent to the other antennas so that they remain mute. The antennas used are LF (low frequency) antennas transmitting a magnetic field with a frequency usually lying around 125 kHz with a restricted range thus allowing good locating of the corresponding tag. The dialogs between the inside antennas and the tag are of a different kind from the dialogs between the outside antennas and tag. This enables the tag to know in advance the response expected by the vehicle. This response is generally effected by transmitting an RF (radio frequency) signal with a frequency generally lying in the vicinity of 433 MHz.

The inside antennas are generally regarded as reliable. The field transmitted by them does not generally spill over out of the cabin of the vehicle. On the other hand, the outside antennas generally transmit a signal inside the cabin of the vehicle too, generally limited to near the latter's doors. A tag is then regarded as being outside the vehicle if it responds to the outside antennas without however responding to the inside antennas.

The locating of a tag outside the vehicle is therefore based on a nonresponse of the tag to a request by the inside antennas. It may however happen that the tag responds to a request by the inside antennas but that this response is not received by the antennas management device. This problem may stem from several causes, such as for example the presence of glitches or the sending of an RF frame of another system using the same frequency band. This nonreceipt of the response by the vehicle antennas management system will be interpreted as a nonresponse to the request of the inside antennas and the tag will then be regarded as being outside the vehicle although it is in fact inside the latter. The management device will therefore give its agreement to execute an order to lock the vehicle although the user does not have his tag on him. Moreover, anybody will be able to unlock the vehicle with the tag still in the vehicle.

SUMMARY OF THE INVENTION

An aim of the present invention is thus to provide a process for locating a tag intended for a motor vehicle hands-free system allowing reliable detection of the presence of a tag outside the vehicle.

Accordingly, the process that it proposes is a process for locating a tag for a hands-free system of a motor vehicle comprising the following steps:
  transmission in the form of an inquiry of a signal by a first group of antennas of the vehicle to the tag,
  possible response of the tag to this first inquiry,
  transmission in the form of an inquiry of a signal by a second group of antennas of the vehicle to the tag,
  possible response of the tag to this second inquiry.

According to the invention, in case of response of the tag to the first inquiry, the tag stores for a predetermined time span T the fact that it has responded to a signal transmitted by an antenna of the first group of antennas and the possible response made to the second inquiry includes, as the case may be, a cue indicating that a response has already been transmitted following an inquiry originating from the first group of antennas, the tag then being located in the zone covered by the first group of antennas if a response is obtained following the first inquiry, in the zone covered by the second group of antennas if a response is obtained following the second inquiry and in the overlap zone covered by the two groups of antennas if the response to the second inquiry furthermore contains a complementary indication indicating that the tag has already responded earlier.

In one form of implementation of this process, the first group of antennas comprises for example antennas transmitting an electromagnetic signal with a range limited substantially to the inside of the vehicle. The second group of antennas comprises for example antennas transmitting an electromagnetic signal with a range limited essentially to the outside of the vehicle.

The present invention also proposes a process for locating, for a hands-free system of a motor vehicle, a tag situated outside the vehicle, the vehicle being equipped with inside antennas transmitting an electromagnetic signal inside the cabin of the vehicle and outside antennas transmitting an electromagnetic signal essentially outside the cabin with a possible spillover inside the cabin, this process comprising the following steps:
  transmission in the form of an inquiry of a signal by the inside antennas of the vehicle to the tag,
  possible response of the tag to this first inquiry,
  transmission in the form of an inquiry of a signal by the outside antennas of the vehicle to the tag,
  response of the tag to this second inquiry.

In this process, according to the invention, in case of response of the tag to the first inquiry, the tag stores for a predetermined time span T (See FIG. 3, steps S2-1 and S4-1) the fact that it has responded to a signal transmitted by an inside antenna and in that the response made to the second inquiry includes, as the case may be, a cue indicating that a response has already been transmitted following an inquiry originating from the inside antennas, the tag then being located outside the vehicle when a response is received following the second inquiry and this response comprises no particular indication.

Here there are two groups of antennas, the inside antennas corresponding to the first group of antennas and the outside antennas to the second group of antennas.

The signals transmitted by the two groups of antennas are preferably low-frequency signals of the order of 125 kHz. Signals of this type are already conventionally used since they allow in particular better control of the zone of coverage of the antennas.

The response of the tag is preferably made in a radio frequency of the order of 433 MHz.

For proper sequencing of the various steps of the process, it is preferable for the inquiry performed by the second group of antennas to be carried out long enough after the inquiry performed by the first group of antennas to allow the tag time to respond to an inquiry before it receives another one.

All the antennas of one and the same group of antennas may simultaneously transmit their inquiry signal for the locating of the tag but, to limit the power of the signal transmitted, the antennas of one and the same group of antennas may also transmit one after another an inquiry to the tag.

BRIEF DESCRIPTION OF THE DRAWINGS

The details and advantages of the present invention will emerge better from the following description, given with reference to the appended diagrammatic drawing, in which.

DESCRIPTION OF THE PREFERRED EMBODIMENTS

Figure 1:
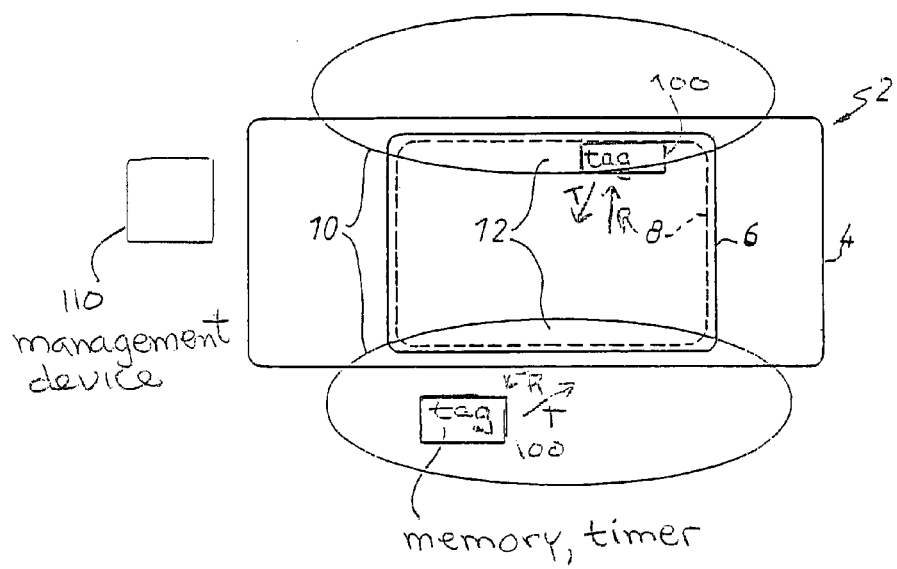
FIG. 1 is a very diagrammatic view of a vehicle viewed from above.

In FIG. 1, a vehicle 2 is symbolized diagrammatically as viewed from above. A first rectangle 4 symbolizes the outside contour of the vehicle, while a second rectangle 6 symbolizes the cabin of this vehicle 2. The vehicle 2 represented is equipped with a hands-free access system. For access to the vehicle 2, this system enables a user to lock and unlock the doors without having to use a conventional mechanical key. The user simply carries a tag 100 which takes the form for example of an electronic card. The detection of this tag and its identification authorize locking and unlocking when the user requests same and when he carries the tag on him. Such a system is already known to the person skilled in the art.

In a known manner, the vehicle 2 is equipped with a first group of antennas, subsequently referred to as the inside antennas, which is capable of transmitting an electromagnetic signal inside the cabin 6. A second group of antennas, subsequently referred to as the outside antennas, transmits an electromagnetic signal of the same type as that transmitted by the inside antennas but outside the vehicle 2. The electromagnetic signal transmitted by these antennas is a signal of LF (low frequency) type which, in the embodiment described, exhibits a frequency of 125 kHz. In FIG. 1, the substantially rectangular dashed curve bearing the reference 8 symbolizes the range of the inside antennas, that is to say the zone in which the signal transmitted by the inside antennas can be picked up by a tag of the hands-free system. Likewise, two curves of substantially elliptical shape bearing the reference 10 symbolize the range of the outside antennas.

As is generally the case in vehicles equipped with a hands-free system, an overlap zone 12 exists. If a tag is in this overlap zone 12, it can at one and the same time pick up a signal transmitted by an outside antenna and a signal transmitted by an inside antenna. Problems then arise when it is necessary to locate a tag and when the latter is in an overlap zone 12. In prior art solutions, the range of the inside antennas is considered not to spill over out of the cabin 6 of the vehicle. Hence, if a tag is detected following the transmission of a locating inquiry by an inside antenna, this tag will be regarded as being inside the vehicle, even if it also responds to a request from an outside antenna.

The problem which then arises is when the response transmitted by the tag following a request from the inside antennas does not reach the management device 110 of the hands-free system of the vehicle. This can happen for any reason whatsoever, such as for example a nuisance neighboring transmission. So, if the response following the request from the outside antennas reaches the management device of the hands-free system of the vehicle, the tag is identified as being outside the vehicle although it is in fact inside the latter.

The solution proposed by the invention is illustrated with reference to FIG. 2. In this figure, three charts symbolize signals transmitted. In the first chart, at the top, are diagrammatically represented LF signals transmitted by the outside antennas and the inside antennas. In the second chart, in the middle, are diagrammatically represented the responses transmitted by the tag following the request from the outside and inside antennas. Finally, the third chart, at the bottom, corresponds to the second chart with in addition a nuisance signal. For all these charts, there is a common time axis along the abscissa.

Figure 3:
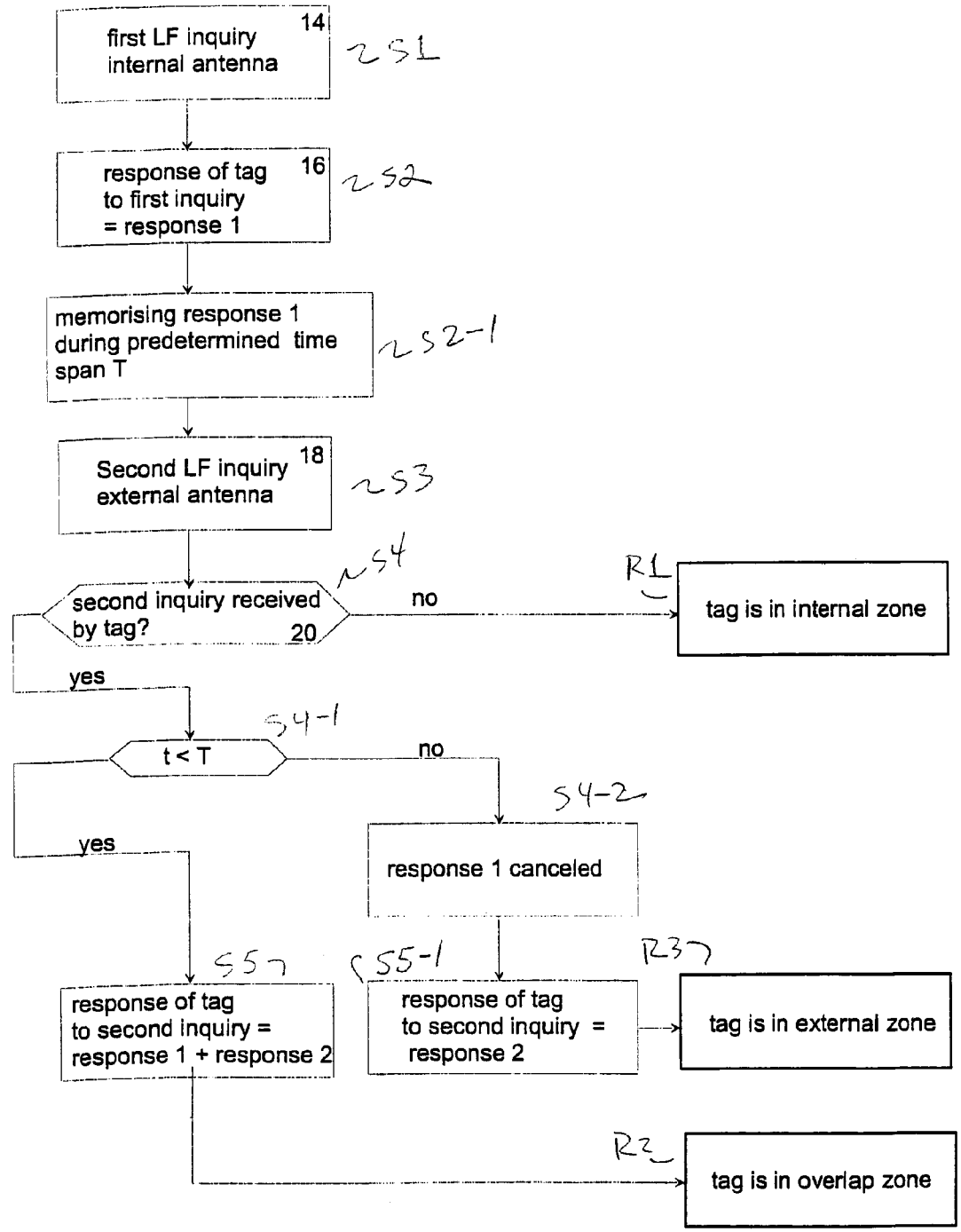
FIG. 3 is a flow chart illustrating the steps of the invention.

In the first chart, a first gate 14 symbolizes the transmission of an LF signal by the inside antennas. See step S1 of FIG. 3. It is assumed here that a tag of the hands-free system is inside an overlap zone 12. This tag then picks up the LF signal transmitted by an inside antenna and corresponding to the gate 14. See the arrows R in FIG. 1 for transmissions by the antennas, received by the tag. It then transmits in response an RF (radio frequency) signal with a frequency of 433 MHz (another frequency of the same type may be adopted). See step S2 of FIG. 3. This response is made immediately after receipt of the LF signal transmitted by the inside antennas. See the arrows T in FIG. 1 for transmissions by the tag. It is shown diagrammatically in the drawing by a hatched gate 16. The interval between the transmission of the LF signal by the inside antennas and the response made by the tag is of the order of a millisecond (1 ms).

After a time span sufficient to allow the tag to respond to the request from the inside antennas has elapsed, i.e. for example after around 5 ms, the outside antennas transmit in their turn an LF signal shown diagrammatically in the first chart by a second gate 18. See step S3 of FIG. 3. Although represented in a similar manner in the first chart of FIG. 2, the LF signals transmitted by the inside antennas and the outside antennas may be of different kinds, so enabling the tag to know the response expected by the control device of the hands-free system.

If the tag is outside the outside antenna range 10, the tag will not receive the second inquiry 18. In step S4 of FIG. 2, this result R1 is shown as a determination that the tag is in the internal zone of the inside antennas.

When in the overlap zone (12), the tag in question also receives the signal represented by the gate 18 transmitted by the outside antennas. See step S4 of FIG. 3. The tag then responds to this inquiry signal on the part of the vehicle by an RF type signal shown diagrammatically in the second chart by second gate 20. See step S5 of FIG. 3. This signal contains both the response to the request to the outside antennas and the response that has already been made following the request from the inside antennas. This response made following the request by the inside antennas has been stored in the tag and is retransmitted in superposition with the response to the request by the outside antennas. See step S2-1 showing storage of the first response. Thus, the gate 20 in FIG. 2 is hatched as is the gate 16 but additionally comprises small circles corresponding to the response made following the request by the outside antennas. The response thus formulated by the tag signifies not only that the tag has actually received the inquiry signal transmitted by the outside antennas for locating purpose but it also indicates that a short time (t<T, step S4-1) earlier it had already received a request from the inside antennas and that it responded to this request. The management device of the hands-free system of the vehicle which receives this response then knows that the tag is in an overlap zone 12 and therefore deduces therefrom that there is an overlap problem. See result R2 in FIG. 3 and result R3 when the elapsed time of step S4-1 is not less than. In such a case, the management device will then prohibit the locking of the doors of the vehicle 2.

The response made following the request by the inside antennas should not be stored for too long so as to avoid the appearance of other problems. If the numerical examples given earlier are considered, it can for example be assumed that the response is stored for around 10 ms. See steps S4-1, S4-2 of FIG. 3. However, when the tag's search is performed outside not through a simultaneous inquiry of all the outside antennas but through successive enquiries of subgroups of antennas, this storage time may be raised for example to 200 ms.

Figure 2:
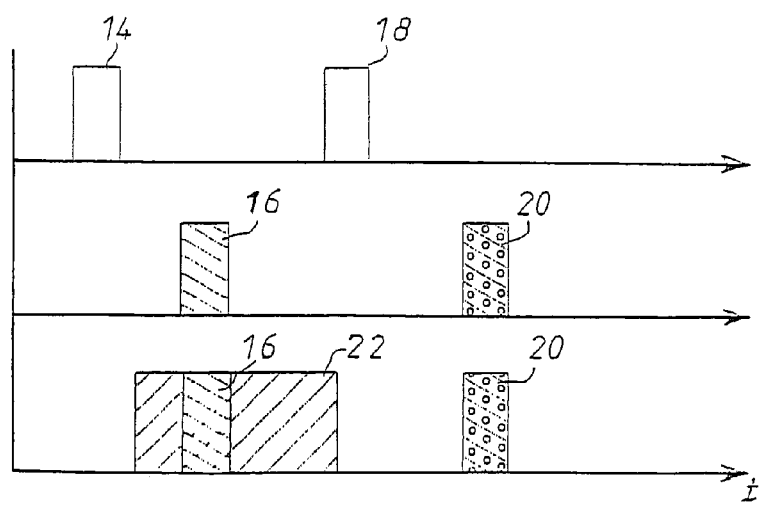
FIG. 2 shows charts illustrating transmissions of LF and RF signals.

The third chart of FIG. 2 illustrates the case where the response made by the tag following the request by the inside antennas does not reach the device for managing the outside antennas on account of the presence of glitches. This third chart therefore also includes the gates 16 and 20 which correspond to the responses made by the tag following the requests made by the inside antennas and then the outside antennas. Relative to the second chart, a glitch frame 22 has also been represented, which overlaps the gate 16, that is to say the response made by the tag following the request by the inside antennas. The management device of the hands-free system of the vehicle then receives only the response signal corresponding to the second gate 20. Since this signal contains both a response to the request from the outside antennas and the response to the request from the inside antennas, the management device knows that the tag is in an overlap zone even though it received no response from the tag after the inquiry signal transmitted by the inside antennas.

The process for locating a hands-free system tag described hereinabove makes it possible to increase the reliability of these systems by avoiding a false interpretation by the management device of the signals received (and not received). More reliable locating can be achieved without requiring the implementation of hardware means different from those implemented in contemporary hands-free systems. The same transmitter and receiver means as those known to the person skilled in the art in respect of contemporary hands-free systems are found here also. The electronics of contemporary tags is sufficiently developed to allow problem-free storage of a signal so as to retransmit it subsequently. This process therefore makes it possible, without increasing the price of the hardware implemented, to increase the reliability of the hands-free system.

The present invention is not limited to the process described hereinabove by way of nonlimiting example. It also relates to any alternative embodiment within the scope of the person skilled in the art within the framework of the claims hereinbelow.

Thus, for example, the signal transmitted by the tag, when it has already responded to a request by a group of antennas a short time earlier, is not necessarily the superposition of two response signals. Provision may for example be made simply for a one-bit coded cue that indicates whether or not a response following a location inquiry has been made by the tag within a predetermined time span preceding the response transmitted. The cue is represented as part of transmission T in FIG. 1. Without then storing the first response transmitted, the tag then stores only the fact that it has already responded to a request previously.

The frequencies, the durations, in a general manner all the numerical values, given in the description are given purely by way of indication. Other values may be adopted without however departing from the framework of the present invention.

The invention claimed is:

1. A process for locating a tag for a hands-free system of a motor vehicle comprising the steps of:
   in a system comprising a tag (100), a first group of vehicle antennas defining a first antenna coverage zone, a second group of vehicle antennas defining a second antenna coverage zone, and a third antenna coverage zone defined by overlapping portions of the first and second antenna coverage zones,
   transmitting, from the first group of antennas to the tag, a first inquiry signal (14);
   transmitting, from the tag to the first group of antennas, a first response (16) to the first inquiry signal, and storing within the tag, for only a predetermined time span (T), a record of the first response;
   transmitting, from second group of antennas to the tag, a second inquiry signal (18);
   transmitting, from the tag to the second group of antennas,
   i) a second response (20) to the second inquiry, the second response including the stored record of the first response when an elapsed time period from transmitting the first response to transmitting the second response is less than the predetermined time span (T) and the second response being free of the stored record of the first response when the elapsed time period from transmitting the first response to transmitting the second response is not less than the predetermined time span (T); and
   determining a location of the tag to be
   i) in the first antenna coverage zone when the first response (16) is received by the first group of antennas,
   ii) in the second antenna coverage zone when the second response (20) is received by the second group of antennas, and iii) in the third antenna coverage zone when the second response is received by the second antennas and the second response comprises the stored record of the first response.

2. The process as claimed in claim 1, wherein the first group of antennas comprises antennas transmitting an electromagnetic signal with a range limited substantially to the inside of the vehicle.

3. The process as claimed in claim 1, wherein the second group of antennas comprises antennas transmitting an electromagnetic signal with a range limited essentially to the outside of the vehicle.

4. The process of claim 1, wherein, in the determining step, the location of the tag is in the second antenna coverage zone when the second response (20) is received by the second group of antennas and the second response is free of the stored record of the first response.

5. The process as claimed in claim 1, wherein the signals transmitted by the two groups of antennas are low-frequency signals of the order of 125 kHz.

6. The process as claimed in claim 1, wherein the response of the tag is made in a radio frequency of the order of 433 MHz.

7. The process as claimed in claim 1, wherein the inquiry (18) performed by the second group of antennas is carried out long enough after the inquiry (14) performed by the first group of antennas to allow the tag time to respond to an inquiry before it receives another one.

8. The process as claimed in claim 1, wherein the antennas of one and the same group of antennas transmit one after another an inquiry (14, 18) to the tag so as to limit the power of the signal transmitted.

9. The process as claimed in claim 2, characterized in that the second group of antennas comprises antennas transmitting an electromagnetic signal with a range limited essentially to the outside of the vehicle.

10. A process for locating, for a hands-free system of a motor vehicle, a tag situated either inside or outside the vehicle, the vehicle being equipped with inside antennas transmitting an electromagnetic signal inside a cabin (6) of the vehicle and outside antennas transmitting an electromagnetic signal essentially outside the cabin (6) with a spillover inside the cabin (6), and the vehicle being equipped with a system management device (110), this process comprising the following steps:

transmitting in the form of a first inquiry (14) a signal by the inside antennas of the vehicle to the tag, transmitting a first response (16) by the tag to the first inquiry, transmitting in the form of a second inquiry a signal (18) by the outside antennas of the vehicle to the tag, transmitting a second response (20) of the tag to the second inquiry, wherein, in the first response (16) of the tag to the first inquiry (14), the tag stores, for only a predetermined time span (T), a record of the first response, the second response (20) of the tag includes transmission of the stored record of the first response when the second response is made within the predetermined time span, the tag is determined to be located outside the vehicle when the second response is received, and the tag is determined to be in an overlapping zone of the first and second antennas when the second response is received by the second antennas and the second response comprises the stored record of the first response.

11. The process as claimed in claim 10, wherein the signals transmitted by the two groups of antennas are low-frequency signals of the order of 125 kHz.

12. The process as claimed in claim 10, wherein the response of the tag is made in a radio frequency of the order of 433 MHz.

13. The process as claimed in claim 10, wherein the inquiry (18) performed by the second group of antennas is carried out long enough after the inquiry (14) performed by the first group of antennas to allow the tag time to respond to an inquiry before it receives another one.

14. The process as claimed in claim 10, wherein the antennas of one and the same group of antennas transmit one after another an inquiry (14, 18) to the tag so as to limit the power of the signal transmitted.

* * * * *